Oct. 25, 1966
J. B. YOUNG
3,281,037
INTERMITTENT STRIP FEED MECHANISM HAVING
ADJUSTABLE REGISTRATION MEANS
Filed Jan. 27, 1964
6 Sheets-Sheet 1
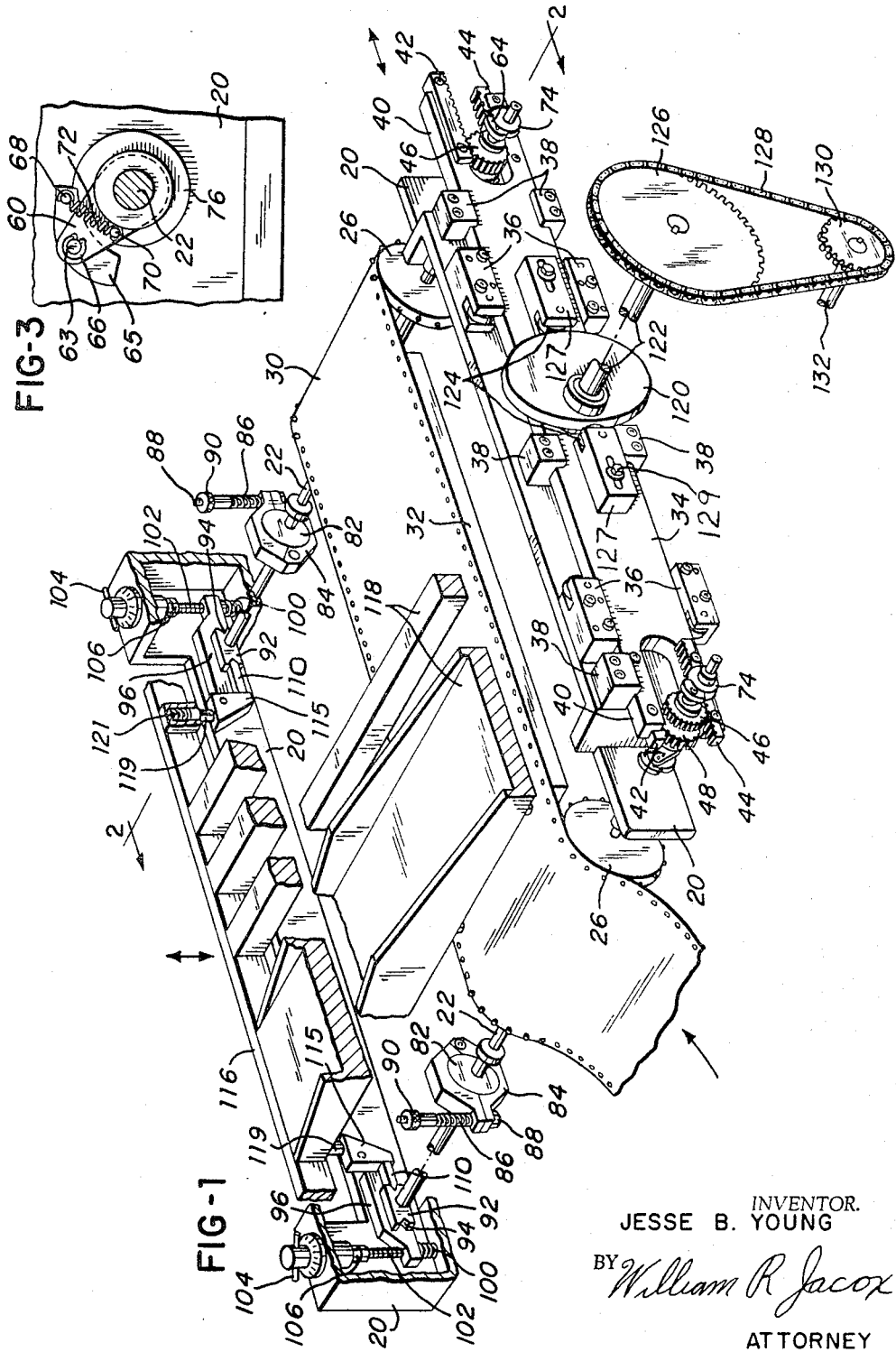
INVENTOR.
JESSE B. YOUNG
BY William R Jacox
ATTORNEY

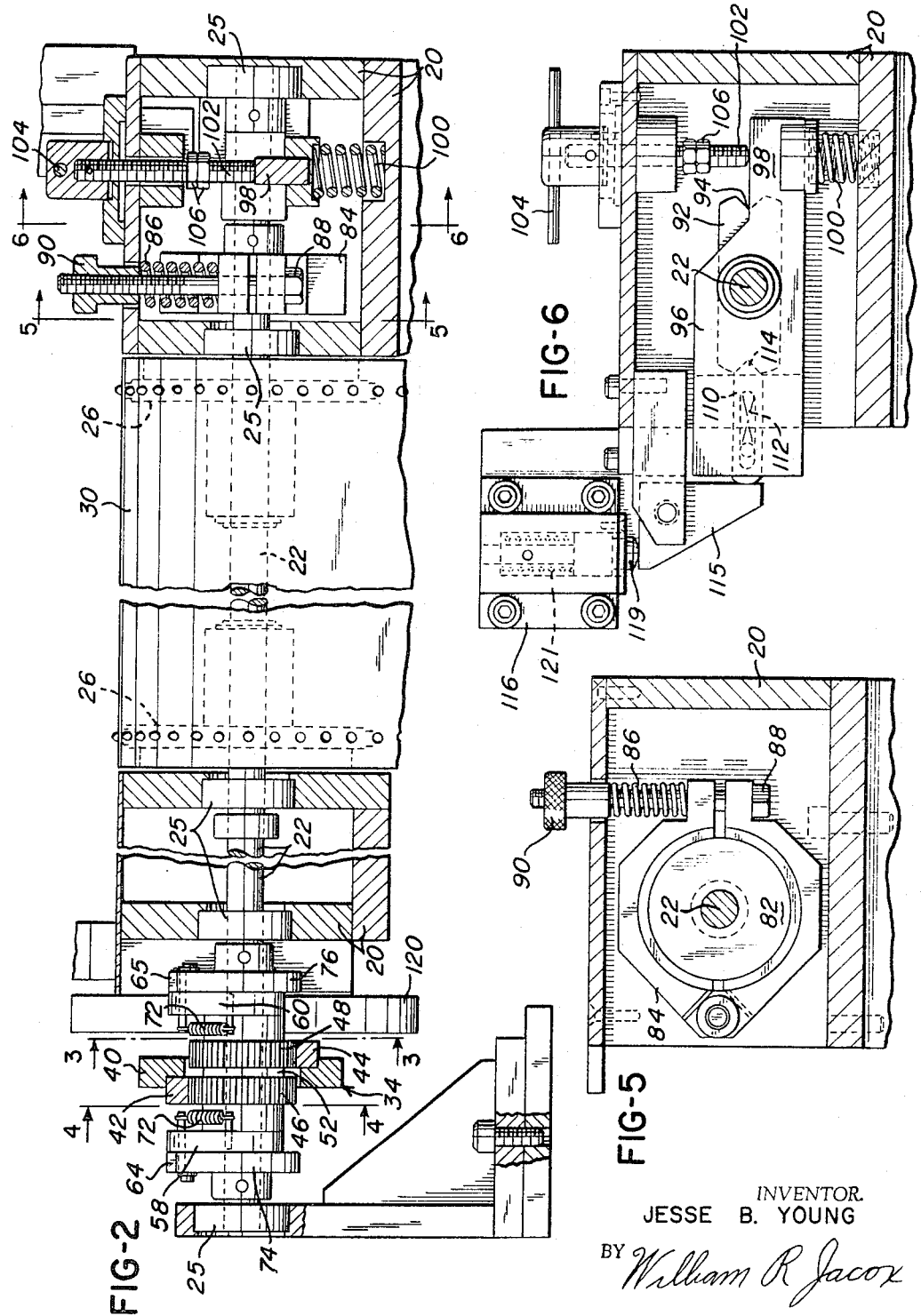

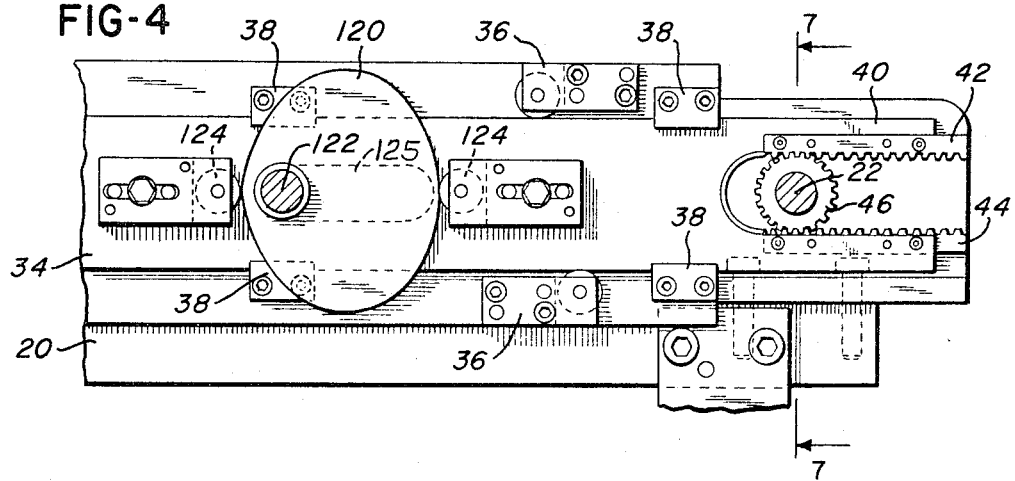
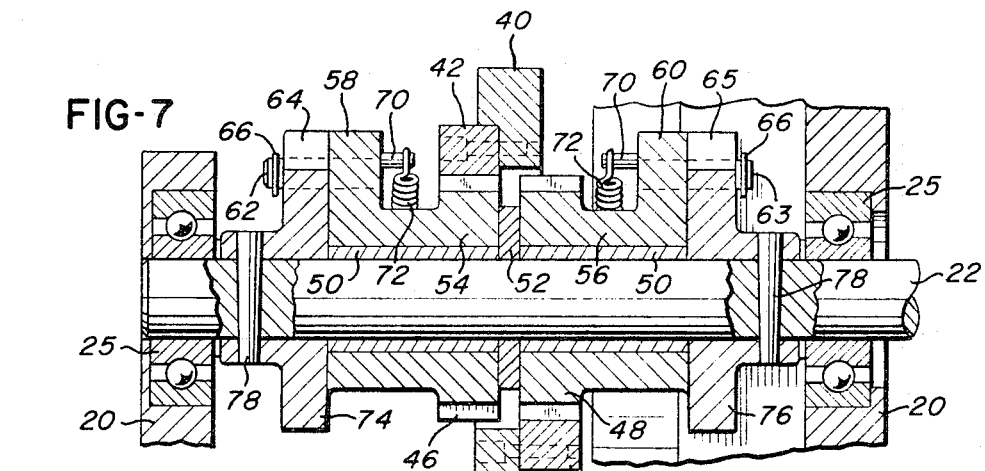
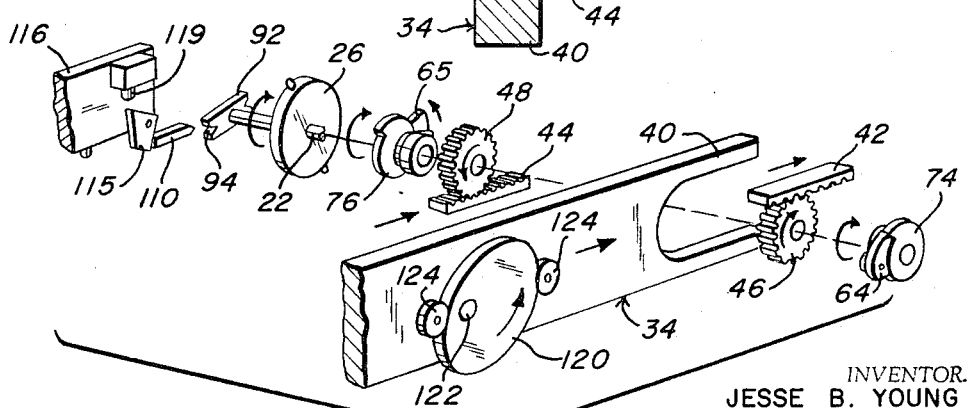

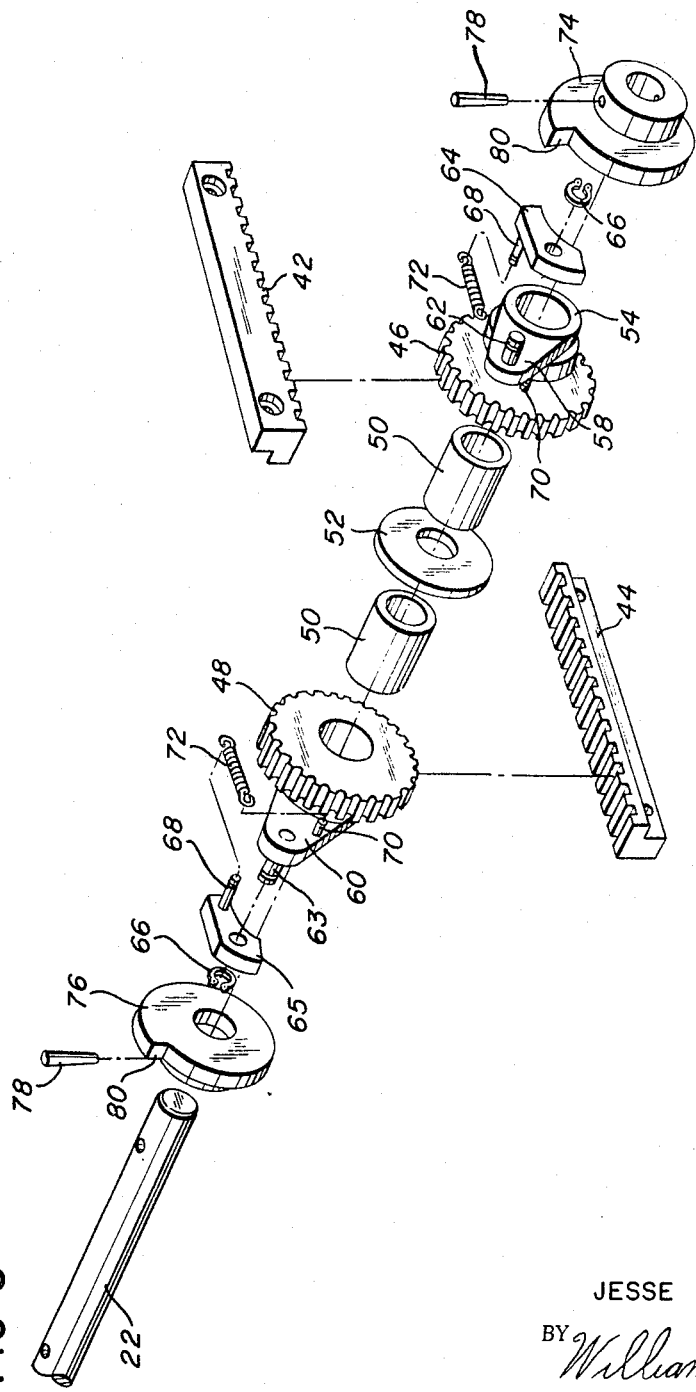

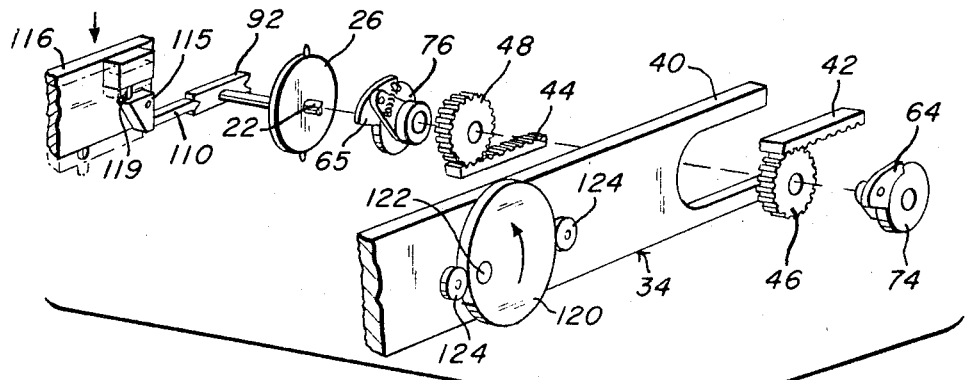
FIG-10
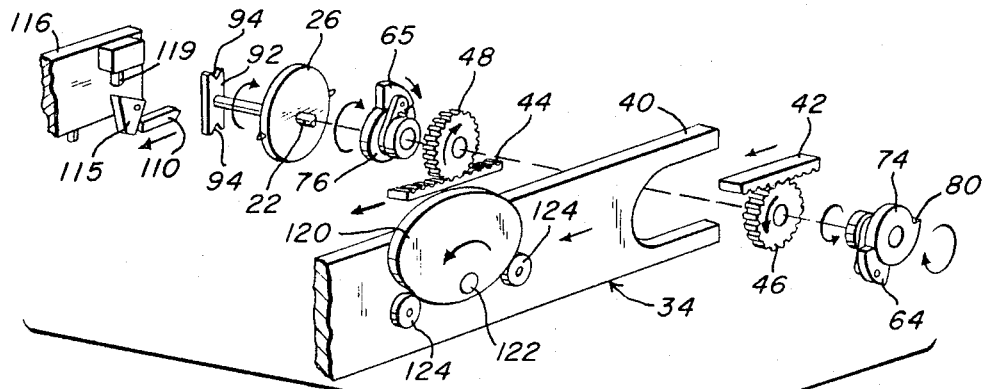
FIG-11
FIG-12
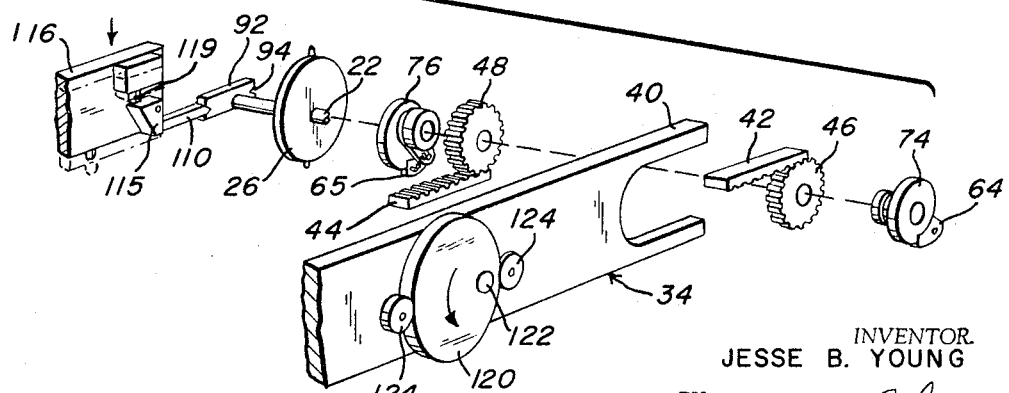

Oct. 25, 1966    J. B. YOUNG    3,281,037
INTERMITTENT STRIP FEED MECHANISM HAVING
ADJUSTABLE REGISTRATION MEANS
Filed Jan. 27, 1964    6 Sheets-Sheet 6
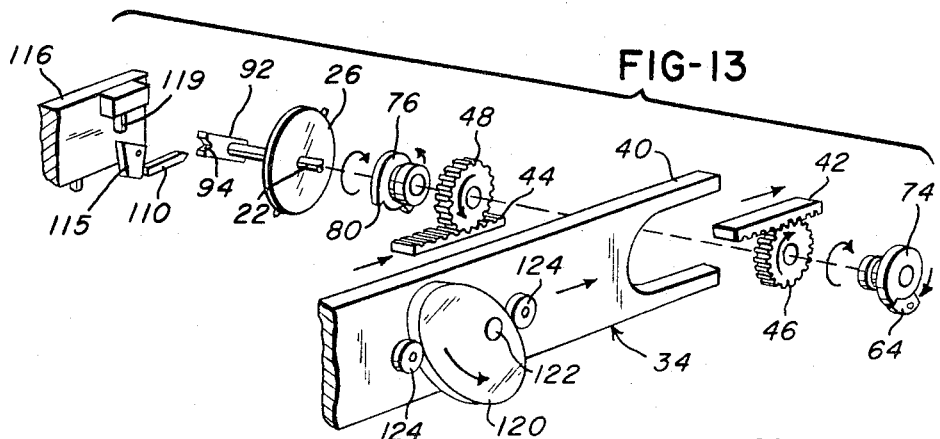
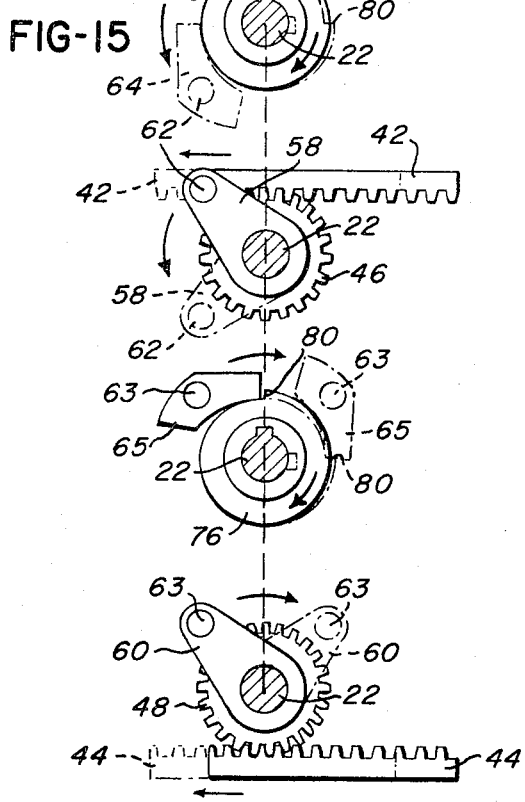
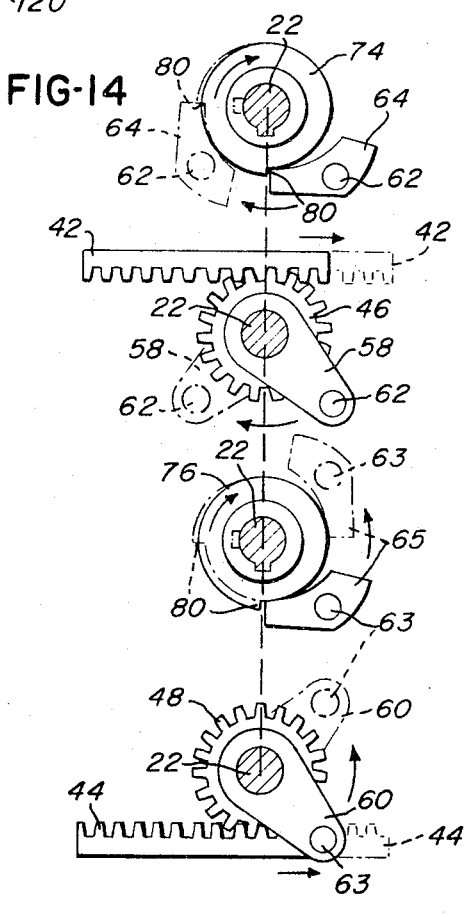
INVENTOR.
JESSE B. YOUNG
BY William R. Jacox
ATTORNEY

United States Patent Office 3,281,037
Patented Oct. 25, 1966

3,281,037
INTERMITTENT STRIP FEED MECHANISM HAVING ADJUSTABLE REGISTRATION MEANS
Jesse B. Young, Dayton, Ohio, assignor to The Standard Register Company, a corporation of Ohio
Filed Jan. 27, 1964, Ser. No. 340,176
12 Claims. (Cl. 226—59)

This invention relates to strip feed mechanism. The invention relates more particularly to feed mechanism for a continuous web or strip or the like.

An object of this invention is to provide mechanism which accurately and precisely moves a web or strip, regardless of the rate of movement thereof.

Another object of this invention is to provide strip feed mechanism which moves a web or strip at varying rates of speed comprising rapidly accelerating a web to a given rate of movement, followed by rapidly decelerating the movement of the web to zero speed, followed by maintaining the web at zero speed for a short interval of time, followed by again rapidly accelerating the web to the given rate of movement, etc.

Another object of this invention is to provide mechanism which performs an operation upon a web at a precisely and accurately determined portion thereof.

Another object of this invention is to provide feed mechanism which can be used with reciprocally movable web engagement means.

Another object of this invention is to provide means by which register of the web can be readily adjusted during operation of the mechanism.

Another object of this invention is to provide mechanism by which reciprocal linear motion is changed to unidirectional rotary motion in which each direction of reciprocal linear movement serves to unidirectionally advance the rotary movement.

Other objects and advantages reside in the construction of parts, the combination thereof, the method of manufacture, and the mode of operation, as will become more apparent from the following description.

In the drawings:

FIGURE 1 is a diagrammatic type of perspective view, with parts broken away and shown in section, of strip feed mechanism of this invention.

FIGURE 2 is an enlarged sectional view taken substantially on line 2—2 of FIGURE 1.

FIGURE 3 is a sectional view taken substantially on line 3—3 of FIGURE 2.

FIGURE 4 is a sectional view taken substantially on line 4—4 of FIGURE 2.

FIGURE 5 is a sectional view taken substantially on line 5—5 of FIGURE 2.

FIGURE 6 is a sectional view taken substantially on line 6—6 of FIGURE 2.

FIGURE 7 is a sectional view taken substantially on line 7—7 of FIGURE 4.

FIGURE 8 is an enlarged exploded perspective view, of the diagrammatic type, showing a portion of the mechanism of this invention.

FIGURE 9 is an exploded perspective view, of the diagrammatic type, on a smaller scale than FIGURE 8, showing a portion of the mechanism of this invention in the operation thereof.

FIGURE 10 is an exploded perspective view, similar to FIGURE 9, showing another step in the operation of the mechanism.

FIGURE 11 is an exploded perspective view, similar to FIGURES 9 and 10, showing another step in the operation of the mechanism.

FIGURE 12 is an exploded perspective view, similar to FIGURES 9, 10 and 11, showing another step in the operation of the mechanism.

FIGURE 13 is an exploded perspective view, similar to FIGURES 9, 10, 11 and 12, showing another step in the operation of the mechanism.

FIGURE 14 is a diagrammatic view illustrating the operation of a portion of the mechanism of this invention.

FIGURE 15 is a diagrammatic view, similar to FIGURE 14, showing another step in the operation of the mechanism of FIGURE 14.

Referring to the drawings in detail, this invention comprises strip feed mechanism which is particularly adapted for use in conjunction with reciprocally operable apparatus which engages a web for cutting and/or printing or the like upon the web.

The mechanism of this invention comprises any suitable support structure 20, as shown in part in FIGURES 1, 2 and 7. A pair of spaced-apart shafts 22 are rotatably carried by the support structure 20. Bearing members 25, shown in FIGURE 7, illustrate the manner in which each shaft 22 is rotatably supported. Each of the shafts 22 carries any suitable means, such as pin wheel members 26, for movement of a web 30, shown in FIGURE 1, with rotation of the shafts 22. A back-up member 32, shown in FIGURE 1, may be used to support the web 30 intermediate the shafts 22 when the web 30 is engaged for operation thereupon.

A reciprocally linearly movable carrier member or plate 34 is supported by any suitable means such as by guides 36 and 38. The carrier member or plate 34 has a yoke portion 40 at each end thereof. The yoke portion 40 at each end of the plate 34 partially encompasses one of the shafts 22.

Each yoke portion 40 carries an elongate rack gear member 42 and an elongate rack gear member 44, as shown in several figures of the drawings. Each rack gear member 42 is at one portion of its respective shaft 22 and each rack gear member 44 is at the opposite portion of the shaft 22, with teeth of each of the rack gear members 42 and 44 facing the shaft 22.

Encompassing each shaft 22 are a pair of rotary gear members 46 and 48. Each of the rotary gear members 46 and 48 is rotatably carried upon its respective shaft 22 by means of a bearing 50, shown in FIGURE 7. A spacer 52 separates the rotary gears 46 and 48 one from the other, as shown in FIGURES 2, 7 and 8.

A connecting sleeve 54, shown in FIGURE 7, is joined integrally or otherwise to the rotary gear 46. A connecting sleeve 56 is joined in like manner to the rotary gear 48. Joined to the connecting sleeve 54 is an arm 58, shown in FIGURES 7 and 8. Joined to the connecting sleeve 56 is an arm 60. The arm 58 has a pin 62 which pivotally supports a pawl 64. The arm 60 has a pin 63 which pivotally supports a pawl 65. A clip 66 encompasses each pin 62 and 63 and retains the pawls 64 and 65, respectively, thereupon.

Each pawl 64 and 65 has a stud 68 and the arms 58 and 60 each have a stud 70. A spring 72 extends between the studs 70 and 68 and urges pivotal movement of the pawls 64 and 65 into engagement with drive members 74 and 76, respectively.

Each of the drive members 74 and 76 encompasses the shaft 22 and is secured thereto by means of a pin 78 for rotation therewith.

Each of the drive members 74 and 76 is provided with an engagement shoulder 80, shown in FIGURE 8. Each pawl 64 and 65 is engageable with the engagement shoulder 80 of its respective drive member 74 or 76 for rotative movement thereof.

Each shaft 22 also carries a disc 82 rigidly attached thereto for rotation therewith, as shown in FIGURES 1 and 5. Each disc 82 is encompassed by a drag brake member 84 parts of which are resiliently urged into engagement with the disc 82 by means of a spring 86 which encompasses a bolt 88. The force of each spring 86 is adjusted by a nut 90 attached to the bolt 88. The drag brake member 84 by slight constant pressure upon the disc 82 provides a slight resistance to rotation of the shaft 22 which is in supporting relationship thereto.

Each shaft 22 also carries an alignment member 92 which is attached thereto for rotation therewith. Each alignment member 92 has one or more suitable engagement portions, such as V-shaped notches 94, as shown in FIGURES 9–13.

FIGURE 6, illustrates the manner by which each shaft 22 rotatably supports a block 96 which is adjacent the alignment member 92. Each block 96 has an end 98 which rests upon a spring 100 which is carried by the support structure 20. A stem 102 also engages the end 98 of the block 96 and urges the end 98 toward the spring 100 and determines the angular position of the block 96 with respect to the support structure 20. The stem 102 has a handle 104 for rotation thereof and lock nuts 106 for limiting the movement thereof.

The portion of the block 96 opposite the end 98 carries a ram 110 which is biased by means of a spring 112. The ram 110 has a tapered end 114 which is complementary to the V-shaped notches 94 of the alignment member 92. The tapered end 114 is adapted to snugly fit into any one of the V-shaped notches 94. The spring 112 urges movement of the ram 110 in a direction from the alignment member 92.

A pivotal actuator member 115 is engageable with the ram 110 for movement thereof.

As shown in FIGURE 1, a head 116 carries one or more web engagement members 118. The head 116 is reciprocally movable so that the engagement members 118 are movable toward and away from the web 30. The engagement members 118 may print upon the web 30 and/or cut or perforate the web 30, or perform any other operation thereupon, according to the desired function thereof.

A plunger 119, shown in FIGURES 1, 6, and 9–13 is carried by the head 116 and is engageable with the actuator member 115 during movement of the head 116 toward the web 30. As shown in FIGURES 1 and 6, the plunger 119 is urged toward the web 30 by means of a spring 121.

The carrier member or plate 34 is reciprocally moved by a cam 120 which is eccentrically mounted upon a shaft 122 for rotation therewith. The cam 120 engages cam follower members 124 which are carried by blocks 127 which are adjustably attached to the plate 34 by means of bolts 129, as shown in FIGURE 1. Both of the cam follower members 124 are in engagement with the cam 120. As shown in several figures, the shaft 122 and the cam follower members 124 are in alignment.

The carrier member or plate 34 is provided with an elongate slot 125, shown in FIGURE 4, through which the shaft 122 extends. The slot 125 permits linear movement of the carrier member 34 with respect to the shaft 122. Thus, rotation of the cam 120 causes linear movement of the carrier member 34. Due to the fact that the cam followers 124 are adjustable with respect to the plate 34, the cam followers 124 may be adjusted to compensate for wear of the cam 120 and/or the cam followers 124.

The shaft 122 may be rotated by any suitable means. Herein the shaft 122 is rotated by a sprocket wheel 126, shown in FIGURE 1, which is engaged by a chain 128 which is driven by a sprocket 130 carried by a shaft 132. Preferably, but not necessarily, the shaft 132 is rotated or controlled by means which also reciprocally moves the head 116.

*Operation*

As the shaft 122 is rotated, the cam 120 is caused to rotate. Rotation of the cam 120 causes linear reciprocal movement of the carrier member or plate 34. The shaft 122 is eccentric with respect to the cam 120 and the cam 120 is so shaped that the plate 34 is rapidly accelerated to a given rate and then rapidly decelerated to zero speed. When the cam 120 is positioned in the manner shown in FIGURES 1, 10 and 12 and for a few degrees of movement prior to and after reaching such positions there is no movement of the plate 34. This is due to the fact that during these periods in the rotation of the cam 120 in which the cam 120 is positioned substantially as shown in FIGURES 1, 10 and 12, each of the cam followers 124 is engaged by a portion of the cam 120 which is an arc of a circle, with the shaft 122 as the center.

During all other periods in the rotative movement of the cam 120 the slide plate 34 linearly moves.

FIGURES 9–15 illustrate operation of the elements at the right hand portion of the mechanism as the mechanism appears in FIGURE 1. Elements of the mechanism at the left hand portion thereof operate in a similar manner. FIGURES 9 and 14 show the mechanism as the plate 34 moves toward the right. Of course, when the plate 34 moves toward the right, the rack gears 42 and 44 move toward the right. Such movement of the rack gears 42 and 44 causes rotation of the rotary gears 46 and 48 in the manner shown in FIGURE 14. Thus, the rotary gear 46 is rotated clockwise and the rotary gear 48 is rotated counter-clockwise. As stated above, the rotary gear members 46 and 48 are rotatively carried by the shaft 22.

Thus, the arm 58 which is connected to the gear 46 rotates clockwise. Thus, the pawl 64 which is carried by the arm 58 moves in a clockwise direction. The pawl 64 is urged by its spring 72 to pivotally move into engagement with the drive member 74. Thus, when the pawl 64 reaches the engagement shoulder 80 of the drive member 74, the pawl 64 engages the shoulder 80 thereof and rotatively moves the drive member 74 clockwise, as shown in FIGURE 14. Due to the fact that the drive member 74 is attached to the shaft 22, the shaft 22 is rotatively moved clockwise with rotative movement of the drive member 74.

The drive member 76 also is non-rotatively attached to the shaft 22 and rotates clockwise therewith. During this period the rotary gear 48 is rotated counter-clockwise and causes counter-clockwise movement of the pawl 65, as shown in FIGURE 14. Therefore, the pawl 65 does not engage the shoulder 80 of the drive member 76. Thus, during this period the drive member 76 is not driven for rotation of the shaft 22, but the drive member 76 rotates with rotation of the shaft 22 as the shaft 22 is driven by the drive member 74.

The pawl 64 thus rotatively moves the drive member 74 with rotative movement of the gear 46 as the gear 46 moves with linear movement of the rack gear 42. The mechanism as shown is such that the drive member 74 rotatively moves the shaft 22 substantially one-half revolution upon each driving operation of the drive member 74. However, by changes in the rack gear members 42 and 44 and/or changes in the rotary gears 46 and 48 other degrees of rotative movements of the shaft 22 may be obtained upon each driving operation of each drive member 74 and 76.

During rotation of the shaft 22, the drag brake member 84 places a slight "drag" thereupon so that when driving action upon the shaft 22 stops, rotative movement of the shaft 22 ceases without appreciable coast.

The alignment member 92 rotates with rotation of the shaft 22. The shaft 22 is rotatively moved by the gears 46 or 48 to approximately the desired rotative position thereof. Due to the fact that ordinarily the engagement means 118 must engage the web 30 at a precisely determined position or positions thereupon, the alignment member 92 is used. The desired rotative position of the shaft 22 is the position at which a portion or portions of the web 30 are precisely positioned with respect to the engagement members 118.

As the head 116 is moved toward the web 30 for engagement of the engagement means 118 with the web 30, the plunger 119, which is carried by the head 116, engages the actuator member 115 causing pivotal movement thereof. When the actuator member 115 pivotally moves, a portion thereof engages the ram 110, as shown in FIGURES 6 and 10, causing movement of the ram 110 so that the tapered end 114 of the ram 110 is driven into one of the notches 94 of the alignment member 92. When the ram 110 so engages the alignment member 92 the alignment member 92 is caused to rotatively move into alignment with the ram 110, if such alignment did not exist before such engagement. Rotative movement of the alignment member 92 causes rotative movement of the shaft 22. Thus, movement of the ram 110 into engagement with the alignment member 92 assures correct precise rotative positioning of the shaft 22 and precise positioning of the web 30. This precise positioning of the web 30 occurs immediately before engagement of the web 30 by the engagement means 118, as the head 116 moves the engagement means 118 into engagement with the web 30.

As stated above, when the cam 120 is so positioned as shown in FIGURE 10, there is no rotative movement of the rotary gears 46 and 48. Thus, the engagement means engages the web 30 when there is no movement thereof.

Then after the engagement means 118 engages the web 30 for printing and/or cutting, or perforating or the like, the head 116 moves away from the web 30. At this same instant of time, continuous rotation of the cam 120 brings the cam 120 to a rotative position in which linear movement of the plate 34 results.

However, such movement of the plate 34 is in the opposite direction or toward the left, as shown in FIGURE 11. Thus, the gear rack members 42 and 44 are moved toward the left. Therefore, as shown in FIGURE 15, the gear member 46 rotates counter-clockwise and the gear member 48 rotates clockwise. When the gear 48 moves clockwise, the pawl 65 carried by the arm 60 moves clockwise, engaging the shoulder 80 of the drive member 76 and causing rotative movement of the drive member 76. Thus, the shaft 22 is rotatively moved in a clockwise direction by the gear 48, as shown in FIGURES 11 and 15. Due to the fact that the gear 46 is moving counter-clockwise during this period, the pawl 64 which is moved thereby, does not cause rotation of the drive member 74. However, due to the fact that the drive member 74 is also attached to the shaft 22, the drive member 74 also rotates clockwise.

At the end of the stroke of the plate 34 toward the left, rotation of the shaft 22 ceases. Shortly prior to stopping of the shaft 22, the head 116 begins to move toward the web 30, as shown in FIGURE 12. Thus, immediately after rotative movement of the shaft 22 ceases, the plunger 119 again engages the actuator member 115, causing the actuator member 115 to move the ram 110 into engagement with the alignment member 92. Thus, movement of the ram 110 again assures that the alignment member 92 is in precisely correct rotative position and that the web 30 is in correct linear position before engagement thereof by the engagement means 118.

As stated above, register control of the web 30 can be adjusted by rotatively moving the stem 102 by means of the handle 104. Such adjustment of the stem 102 changes the angular position of the block 96 with respect to the support structure 20, and thus changes the angle at which the alignment member 92 becomes aligned with the ram 110. Such adjustment of the stem 102 can be made while the shaft 22 is rotating or when the shaft 22 is stopped.

Thus, also, mechanism is provided by which unidirectional rotary movement of a driven member is obtained from a reciprocally linearly movable driver member, the driver member driving the driven member in the same rotative direction during each of the two opposite linear directions of movement of the driver member.

Thus, it is understood that the mechanism of this invention provides means by which a web is rapidly moved and rapidly stopped. The web is precisely brought to a desired predetermined position. While the web is stopped, the web may be engaged by any suitable means for operation thereupon. Then the web is rapidly moved in the same direction so that another portion thereof is accurately and precisely brought to a desired location.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Web feed apparatus comprising:
   support structure,
   a rotatable shaft carried by the support structure,
   a pair of drive members attached to the shaft for rotation therewith, each of the drive members having an abutment shoulder,
   a pair of rotary gear members rotatably carried by the shaft,
   a pair of pawl members, there being one pawl member for each of the drive members, each pawl member being engageable with the abutment shoulder of its respective drive member for rotation thereof,
   connection means joining each of the gear members to one of the pawl members so that each pawl member rotatively moves with rotation of its respective gear member,
   a reciprocally linearly movable carrier member carried by the support structure,
   a pair of elongate gear racks carried by the carrier member, there being one gear rack in meshed relationship with each of the rotary gear members,
   linear movement of the carrier member in each direction thus causing rotation of both of the rotary gear members but movement of the carrier member in one direction causing one of the drive members to be driven by the pawl member connected to one of the rotary gear members, and movement of the carrier member in the other direction causing the other drive member to be driven by the pawl member connected to the other gear member, the relationship of the gear racks to the rotary gear members being such that the two gear members always rotate in opposite directions and alternately reverse in direction of rotation with reciprocal movement of the carrier member,
   and web movement means carried by the shaft for rotation therewith for movement of a web with rotative movement of the shaft.

2. Feed mechanism comprising:
   support structure,
   a reciprocally linearly movable carrier member carried by the support structure,
   rotatable cam means in engagement with the carrier member for reciprocal movement thereof,
   a rotatable shaft substantially normal to the line of movement of the carrier member,
   a plurality of drive members attached to the shaft for rotation therewith, each of the drive members having an abutment shoulder,
   a plurality of rotary gear members rotatably carried by the shaft, there being one rotary gear member for each of the drive members,
   a plurality of elongate gear rack members carried by the carrier member and movable therewith, there being one gear rack member for each of the rotary gear members in mesh therewith for rotation thereof, a plurality of pawl members, there being one pawl member for each of the drive members for rotation thereof, means joining each pawl member to one of the rotary gear members for rotation therewith for rotation of its respective drive member with rotation of the rotary gear member, reciprocal linear movement of the elongate gear rack members causing reciprocal rotative movement of the rotatory gear members, and rotative movement of each of the rotary gear members causing its respective pawl member to drive its respective drive member during at least a portion of the rotative movement of the gear member.

3. Strip feed apparatus for feeding a strip at a high rate of speed followed by rapidly bringing the strip to zero speed followed by rapid acceleration to a high rate of speed comprising:

a reciprocally linearly movable carrier member, rotary cam means engageable with the carrier member for movement thereof, a pair of elongate gear racks carried by the carrier member for movement therewith, a shaft rotatably supported adjacent the carrier member, strip movement means carried by the shaft for rotation therewith, a pair of rotary gear members rotatably carried by the shaft, there being one rotary gear member in mesh with each of the gear racks, a pair of pawl members, there being one pawl member for each of the rotary gear members connected thereto for rotation therewith, a pair of drive members attached to the shaft for rotation therewith, each of the drive members having an abutment portion engageable by one of the pawl members.

4. Mechanism of the type described comprising:

support structure, a pair of parallel spaced-apart shafts rotatably carried by the support structure and adapted to support a web for movement thereof, a reciprocally movable engagement member operable upon the web and movable toward and away from a web which is carried by the shafts, a linearly reciprocally movable carrier member movable along a line substantially normal to the line of movement of the engagement member, first drive means, the first drive means reciprocally moving the carrier member, second drive means, the second drive means reciprocally moving the engagement member, means joining the first drive means to the second drive means, a plurality of rack gear members carried by the carrier member for movement therewith, there being two rack gear members adjacent each shaft and disposed on opposite sides thereof and substantially normal thereto, a pair of rotary gear members rotatably carried by each shaft, each of the rotary gear members being in mesh with one of the rack gear members, a plurality of pawl members, there being a pawl member connected to each rotary gear member and movable therewith, a pair of drive members attached to each shaft and rotatable therewith, each drive member having an engagement portion engageable by one of the pawl members for movement of the drive member with movement of the pawl member, a pair of alignment members, there being an alignment member carried by each shaft member and rotatable therewith, a pair of ram members, there being a ram member rotatably carried by each of the shafts, means carried by the support structure and by the engagement member for operation of each ram member, each ram member being operable into engagement with one of the alignment members by movement of the engagement member toward the web, engagement of the ram members with the alignment members causing proper rotative positioning of the shafts with respect to the support structure.

5. In strip feed mechanism, rotary shaft means for support and movement of a strip of material, reciprocally movable strip engagement means movable toward and away from the strip along a line substantially normal to said rotary shaft means for operation upon the strip, linearly reciprocally movable rack gear means movable along a line substantially normal to the rotary shaft means and adjacent thereto, there being a portion of the rack gear means on each of opposite portions of the rotary shaft means, rotary gear means rotatably carried by the rotary shaft means, the rotary gear means being in mesh relationship with the rack gear means, drive means carried by the rotary shaft means for rotation therewith, means joining the rotary gear means to the drive means for rotation of the drive means with rotation of the rotary gear means, means carried by the rotary shaft means and by the strip engagement means for slight rotary movement of the rotary shaft means with movement of the strip engagement means toward the strip.

6. Mechanism of the type described comprising:

a pair of parallel spaced-apart shafts, each of the shafts having strip movement means connected thereto for movement thereof, a plurality of rotary gear members rotatably carried by each of the shafts and rotatable with respect thereto, a plurality of reciprocally movable rack gear members, there being one rack gear member in meshed relationship with each of the rotary gear members, a plurality of drive members connected to each of the shafts for rotation therewith, a plurality of engagement members, there being one engagement member connected to each of the rotary gear members for rotation therewith, each of the engagement members being engageable with one of the drive members for rotation thereof, each shaft being intermittently unidirectionally rotatively moved as the rack gear members reciprocally move.

7. Strip feed mechanism comprising:

a pair of substantially parallel spaced-apart elongate rack gear members, each of the rack gear members having teeth which face the teeth of the other rack gear member, means joined to the rack gear members for simultaneous reciprocal movement thereof, a rotary shaft disposed intermediate the rack gear members, a pair of rotary gear members rotatably carried by the rotary shaft and coaxial therewith, each of the rotary gear members being in meshed relationship with one of the rack gear members, a pair of drive members rotatably carried by the rotary shaft and rotatable therewith, each of the drive members having an engagement shoulder, a pair of pawl members, each pawl member being connected to one of the rotary gear members for rotation therewith, each of the pawl members being engageable with the engagement shoulder of one of the drive members, strip movement means carried by the shaft for engagement with a strip for movement thereof with rotation of the shaft.

8. Strip feed mechanism comprising:

a pair of substantially parallel spaced-apart elongate rack gear members, each of the rack gear members having teeth which face the teeth of the other rack gear member, means joined to the rack gear members for simultaneous reciprocal movement thereof, a rotary shaft disposed intermediate the rack gear members, a pair of rotary gear members rotatably carried by the rotary shaft and coaxial therewith, each of the rotary gear members being in meshed relationship with one of the rack gear members, a pair of drive members rotatably carried by the rotary shaft and rotatable therewith, each of the drive members having an engagement shoulder, a pair of pawl members, each pawl member being connected to one of the rotary gear members for rotation therewith, each of the pawl members being engageable with the engagement shoulder of one of the drive members, means carried by the rotary shaft for engagement with a strip for movement thereof with rotation of the shaft, engagement means reciprocally movable into and out of engagement with the strip for operation thereupon, an alignment member carried by the shaft for rotation therewith, plunger means operable by movement of the engagement means toward the strip, means operable by the plunger means and engageable with the alignment member to rotatively position the shaft.

9. Strip feed mechanism comprising:

a linearly reciprocally movable carrier member, a pair of spaced-apart cam follower members carried by the carrier member for movement therewith, a rotary cam member rotatable about an axis substantially normal to the line of movement of the carrier member, the cam member being in engagement with the pair of spaced-apart cam follower members, the rotary cam member having an arcuate surface portion which is an arc of a circle having a center at the axis of rotation of the cam member, a rotary shaft member, a pair of rotary gear members rotatably carried by the shaft member, a pair of rack gear members carried by the carrier member, each of the rack gear members being in mesh with one of the said rotary gear members, the two rack gear members being at substantially diametrically opposed portions of the shaft and substantially normal to the axis of rotation of the shaft, a pair of drive members carried by the shaft for rotation therewith, each of the drive members having an engagement portion, a pair of pawl members, there being one pawl member connected to each of the rotary gear members for movement therewith, each of the pawl members being engageable with the engagement portion of one of the drive members for rotary movement thereof with rotary movement of the gear member to which the pawl member is connected.

10. In strip feed mechanism, a rotary shaft, strip movement means carried by the shaft for movement of the strip with rotation of the shaft, alignment means carried by the shaft and rotatable therewith, strip engagement means movable into and out of engagement with the strip for operation thereupon, ram means engageable with the alignment means and operable by movement of the strip engagement means toward the strip for rotative movement of the alignment member and for rotative movement of the shaft for alignment of the alignment member for precisely rotatively positioning the shaft immediately prior to engagement of the strip by the strip engagement means so that the strip is precisely positioned immediately prior to engagement thereof by the strip engagement means.

11. In strip feed mechanism:

support structure, a rotary shaft carried by the support structure and provided with movement means for movement of a strip with rotation of the shaft, an alignment member attached to the shaft for rotation therewith, rotary drive means carried by the shaft for rotation thereof, engagement means reciprocally movable toward and away from the strip for operation thereupon, a plunger carried by the engagement means, a pivotally mounted actuator member carried by the support structure, a ram disposed adjacent the alignment member and engageable therewith, the ram being engageable by the actuator member for movement thereby, the plunger engaging the actuator member as the engagement means moves toward the strip, the plunger thus engaging the actuator member causing the actuator member to engage the alignment member to rotatively position the shaft immediately prior to engagement of the strip by the engagement means.

12. The mechanism of claim 11 in which the alignment member has a plurality of notches therein and the ram has an abutment end engageable with the alignment member and movable into one of the notches thereof to rotatively align the alignment member with the ram.

References Cited by the Examiner

UNITED STATES PATENTS

| | | | |
|---|---|---|---|
| 617,253 | 1/1899 | Manville et al. | 226—157 |
| 657,943 | 9/1900 | Kimball | 74—131 X |
| 1,337,908 | 4/1920 | Hembree et al. | 74—55 |
| 1,365,666 | 1/1921 | Dinwiddie | 74—132 X |
| 1,497,296 | 6/1924 | Jappe | 226—115 X |
| 1,976,775 | 10/1934 | Frederick | 226—144 |
| 2,652,247 | 9/1953 | Kane | 226—115 X |

M. HENSON WOOD, JR., *Primary Examiner.*

A. N. KNOWLES, *Assistant Examiner.*